United States Patent
Zhang

(10) Patent No.: US 9,700,778 B2
(45) Date of Patent: Jul. 11, 2017

(54) METHOD FOR PRACTISING GOLF SWING AND DEVICE THEREFOR

(71) Applicant: Xiaofan Zhang, Foshan (CN)

(72) Inventor: Xiaofan Zhang, Foshan (CN)

( * ) Notice: Subject to any disclaimer, the term of this patent is extended or adjusted under 35 U.S.C. 154(b) by 0 days.

(21) Appl. No.: 14/980,184

(22) Filed: Dec. 28, 2015

(65) Prior Publication Data

US 2016/0129331 A1    May 12, 2016

Related U.S. Application Data

(63) Continuation-in-part of application No. PCT/CN2014/077999, filed on May 21, 2014.

(30) Foreign Application Priority Data

Jun. 28, 2013 (CN) .......................... 2013 1 0268216

(51) Int. Cl.
*A63B 69/36* (2006.01)
*G09B 19/00* (2006.01)

(52) U.S. Cl.
CPC .......... *A63B 69/36* (2013.01); *A63B 69/3644* (2013.01); *G09B 19/0038* (2013.01); *A63B 2208/0204* (2013.01); *A63B 2225/09* (2013.01)

(58) Field of Classification Search
USPC ....... 473/221, 222, 225, 257, 258, 259, 266, 473/409
See application file for complete search history.

(56) References Cited

U.S. PATENT DOCUMENTS

| 1,567,530 | A | * | 12/1925 | MacNaughton | ... | A63B 69/3641 |
| | | | | | | 473/229 |
| 5,984,798 | A | * | 11/1999 | Gilmour | ............ | A63B 69/3644 |
| | | | | | | 473/221 |
| 6,582,319 | B2 | * | 6/2003 | Czaja | ................. | A63B 69/3641 |
| | | | | | | 473/257 |
| 7,806,780 | B1 | * | 10/2010 | Plunkett | ............. | A63B 69/3641 |
| | | | | | | 473/229 |
| 9,180,354 | B2 | * | 11/2015 | Wolf | .................. | A63B 69/3641 |
| 2002/0082106 | A1 | * | 6/2002 | Czaja | ................. | A63B 69/3641 |
| | | | | | | 473/258 |
| 2006/0160635 | A1 | * | 7/2006 | Thormer | ............ | A63B 69/3641 |
| | | | | | | 473/259 |

(Continued)

*Primary Examiner* — Nini Legesse
(74) *Attorney, Agent, or Firm* — Wayne & Ken, LLC

(57) ABSTRACT

The present invention provides a golf swing practice method, wherein a swing plane for guiding swing of a club is established, and a member for monitoring the condition whether an included angle is formed between a club body of the club and the swing plane is established outside the swing plane, which are taken as a basis for judging whether a swing action is right or wrong. The present invention also provides a golf swing practice device, which comprises a bracket (1) and a swing guiding frame (2) arranged on the bracket (1), wherein the swing guiding frame (2) forms a certain included angle with the ground; a guiding plane (2-3) for supporting the club is arranged on the surface of the swing guiding frame (2), and concave-convex parts (2-4) or an inductive device (5) are/is arranged outside the guiding plane (2-3), so as to prompt a wrong swing action that an included angle is formed between the club body of the club and the guiding plane during swing to a practicer.

9 Claims, 12 Drawing Sheets

(56) References Cited

U.S. PATENT DOCUMENTS

2008/0070712 A1* 3/2008 Jones ................ A63B 69/3641
 473/257
2010/0048315 A1* 2/2010 Turner ............... A63B 69/3632
 473/259

* cited by examiner

METHOD FOR PRACTISING GOLF SWING AND DEVICE THEREFOR

CROSS REFERENCES TO RELATED APPLICATIONS

This application is a continuation-in-part of International Patent Application No. PCT/N2014/077999 with an international filing date of May 21, 2014, designating the United States, now pending, and further claims priority benefits to Chinese Patent Application No. 201310268216.1. filed Jun. 28, 2012. The contents of all of the aforementioned applications, including any intervening amendments thereto, are incorporated herein by reference.

TECHNICAL FIELD

The present invention relates to the technical field of golf, in particular to a golf swing practice method and device.

BACKGROUND OF THE PRESENT INVENTION

For golf, learning how to establish a right hitting action and a right swing posture belongs to an important issue of a beginner; the difficulty in learning golf lies in the lack of coordination between a club and the human structure; A perfect golf swing depends on a unification degree of the swinging force direction and a time point the golfer choose to swing, but the habitual force exertion direction has great difference from the force exertion direction for rightly hitting the golf, so it is difficult for people to grasp the method without learning; except for a few professional players, most golfer have the problem that the action is non-standard, but there is no standard method in learning, particularly, the golfer is not clear about the conception of a swing plane, so the golfer cannot grasp the right swing plane. Therefore, the golfer can only grope the method by virtue of individual feeling, although a professional coach can guide the golfer on the spot, it is also difficult to learn the right hitting action in a short time and to obtain real-time and effective correction, leading to long-term inaccuracy and no feeling for wrong action. For the reason, in recent years, those relevant skilled in the art propose some golf practice devices to assist the beginners to quickly master essentials of action. For example, in China patent application No. 201010524161.2, the name of the invention is indoor golf swing practice equipment, which is characterized by comprising a suspension type target board, a tee cushion for being placed on the ground, more than one light golf and more than one club, wherein a center of a target, as well as a main horizontal line and a main vertical line that go through the center of a target are arranged on the target board, both the main horizontal line and the main vertical line have scales, a sub-vertical line going through the surface of the target board is arranged on the scales of the main horizontal line, a sub-horizontal line going through the surface of the target board is arranged on the scales of the main vertical line, a light golf fixture is arranged on the surface of the target board, a golf placing central point and an alignment line that goes through the golf placing central point are arranged on the tee cushion, and a target board surface fixture is arranged on the light golf. In the patent structure, the target board with coordinate scales is arranged in front of the hitting point, so as to accurately calculate the deviation degree of hitting at every time, so that a golfer can adjust the action according to relevant data, but there is no relevant guidance auxiliary equipment; therefore, the golfer still needs to grope by virtue of individual feeling; obviously, it is not suitable for the beginners.

For example, in China patent application No. CN200610168399.X, the name of the invention is a guidance piece, which comprises an arc ring surrounding a human model, wherein a grip and a club head are respectively arranged on each end of the club, the grip is connected to a palm of the human model, the club head is connected to the arc ring of the swing guidance piece, and the swing direction of the club head is made to move along the track of the arc ring. Therefore, the guidance piece can help players to know all steps of swing and can provide the self-adjustment for the swing posture and the swing angle to the players. But, the guidance piece does not have an effective method for rightly guiding the swing plane; in addition, as the heights of the players are different, the lengths of clubs are different, and the plane angles of swing are also different; the track of the arc ring of the swing action of the human model shall be established through the grope of the players. Therefore, the guidance piece has a little help for improving the golf playing level of the players.

SUMMARY OF THE PRESENT INVENTION

The purpose of the present invention is to provide a simple, intuitive and right teaching method for teaching so that the player can immediately perceive whether the movement track of a club body of a club is on the right plane in practice in order to overcome the defects of the prior art.

The other purpose of the present invention is to provide a swing practice device which has simple structure and can accurately and systematically provide a standard swing plan in swing practice according to parameters of different human bodies.

The present invention adopts the following technical solution to realize the purposes. A golf swing practice method is characterized in that a swing plane for guiding swing of a club is established, and a member for monitoring the condition whether an included angle is formed between the club body of the club and the swing plane, which are taken as a basis for judging whether the swing action is right or wrong, wherein a straight line formed through the crossing of the swing plane and the ground is a hitting target directional line; By following the plane geometry tangent theory and by using the above member, the swing plane is established and functions as a guidance of swing teaching.

As the further description for the above solution, an indicating member is established to form the swing plane, a guiding plane for guiding the club to slide is arranged on the indicating member, and concave-convex parts or an inductive prompting device are/is arranged at the outer side of the guiding plane, so as to prompt a wrong swing action that an included angle is formed between the club body of the club and the guiding plane during swing to a golfer.

Preferably, a plane board is adopted as the indicating member for guiding the club to slide; a hole for the golfer to go through is formed in the middle of the plane board; the concave-convex parts pointing to the inner part of the hole are arranged at the inner edge of the hole; and the action that the club touches the concave-convex parts during swing is qualitatively taken as the wrong swing action.

Preferably, a frame-shaped member is used as an indicating member for guiding the club to slide; concave-convex parts are arranged at the inner edge or the outer edge of the frame-shaped member; and the action that the club touches the concave-convex parts during swing is taken as the wrong swing action.

The included angle between the swing plane and the ground is 45-65 degrees.

A golf swing practice method is characterized by comprising the detailed steps:
a. establishing indicating member to form the swing plane, and installing the concave-convex parts at the outer side of the guiding plane of the indicating member so as to monitor whether the included angle is formed between the club body of the club and the guiding plane;
b. adjusting the included angle between the swing plane for guiding the swing of the club and the ground according to the number of the club; and
c. holding a club rack by the golfer for swing practice on a swing plane device, and keeping the club body of the club sliding along the swing plane in the swing process.

In the swing process in step c, the golfer holds the club rack for swing practice on the swing plane device; the included angle is formed between the club body of the club and the swing plane; and when the golfer perceives that the club touches the concave-convex parts, the swing is considered to be wrong, so the swing angle needs to be adjusted at the moment to keep that the club body of the club and the swing plane are parallel.

A golf swing practice positioning and indicating device is characterized by comprising a bracket and a swing guiding frame arranged on the bracket, wherein the swing guiding frame forms a certain included angle with the ground; a guiding plane for supporting the club is arranged on the surface of the swing guiding frame; and the inductive prompting device or concave-convex parts is/are arranged outside the guiding plane.

A slant angle of 45-65 degrees is formed between the guiding plane of the guiding frame and the ground.

The inductive prompting device comprises a touch type sensor, a control device and an indicating light source or a horn, wherein the touch type sensor is connected with the control device, and the signal output end of the control device is connected with the indicating light source or the horn.

Through the adoption of the above technical solution, the present invention has the beneficial effects as follows:
1. The golf plane swing practice device designed in the present invention has 100% of correctness for guiding swing teaching. The device can also accurately position standard swing planes of each of different dubs, so as to invent a 'standard swing plane practice device' as the basis for judging the correctness of the swing action.
2. The present invention can immediately perceive the swing effect most intuitively. Each action during swing practice only has two effects: 'right' or 'wrong', and the learning method is very simple. Every golfer can know how to swing immediately after experience, which cannot be realized by all the existing training equipment of the same kind, thereby greatly being beneficial for the development of the global golf.
3. The technical solution of the present invention has intuition, correctness and immediacy. Therefore, a designed 'golf self-learning system' is teaching equipment that can achieve good learning for the swing action without coaches, which changes the swing teaching mode all over the world and has significance of milestone to the golf.

DESCRIPTION OF MARKS IN DRAWINGS 1. bracket; 2. swing guiding frame 2-1, round rod 2-2, round rod 2-3, guiding plane 2-4, concave-convex part; 3. plane board; 4. bole; 5. inductive prompting device 5-1, position touch type sensor 5-2, control device 5-3, indicating light source 5-4, horn; 6. swing plane; 7. club; 8. convex rib 8-1, front surface 8-2, side surface; 9. concave-convex part.

DETAILED DESCRIPTION OF EMBODIMENTS

Geometrically, the tangent means a straight line that just touches some paint of a curve. More accurately, when the tangent goes through some point (i.e., point of tangency) of the curve, the direction of the tangent and the direction of the point on the curve are the same, namely, the point M on the arc moves to the direction of the point of tangency; and when the point M infinitely approaches the point of tangency, the direction of the point M on the arc and the direction of the straight line are the same (pointing to the direction of the straight line). After times of tests, it is known that the tangent principle is applied to golf hitting, namely, the swing movement is an arc track movement, the hitting point is the point of tangency, and the target direction is the direction of the straight line; and when the golf is hit after swing, the golf flies to the target direction. Therefore, the tangent principle provides the theoretical basis for the technical solution of the present invention.

Embodiment 1

Figure 1:
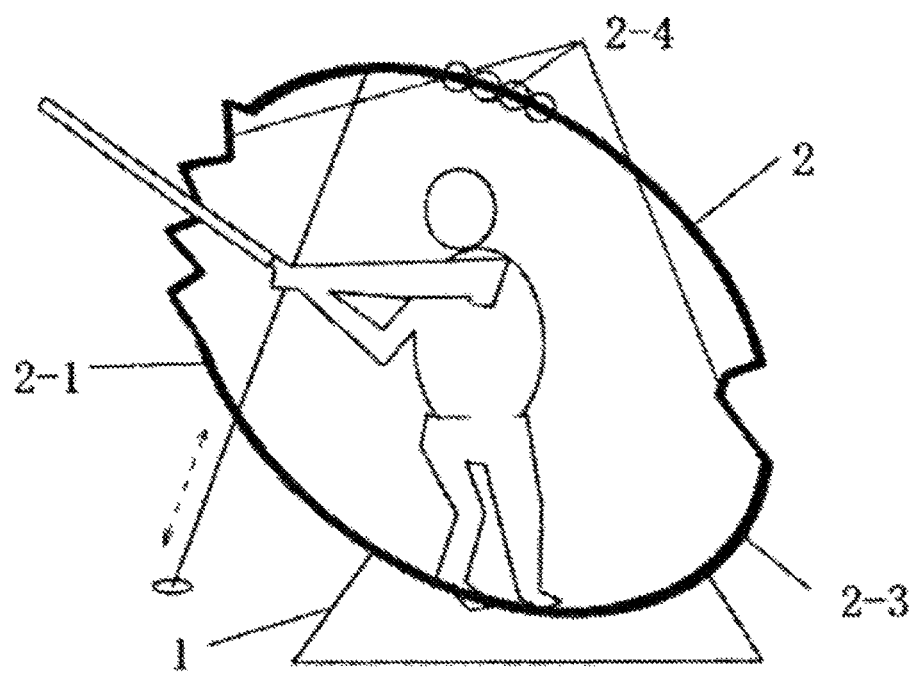
FIG. 1 is a structural diagram of a golf swing practice positioning and indicating device of the present invention.
Figure 2:
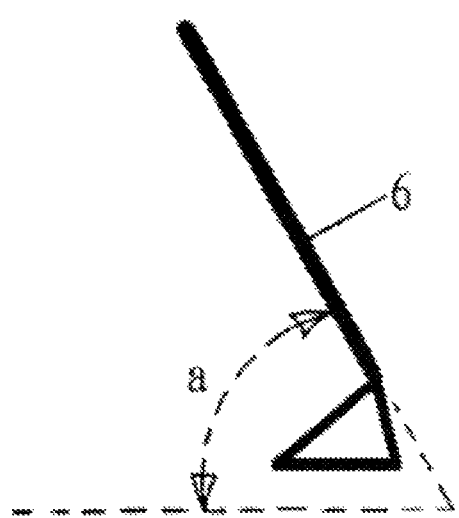
FIG. 2 is a diagram of a swing plane adjusting process of the present invention.

As shown in FIG. 1, in the golf swing practice method of the present invention, the swing plane 6 for guiding swing of the club is established, and as shown in FIG. 2, the member for monitoring the condition whether the included angle is formed between the club 7 and the swing plane 6 is established outside the swing plane 6, which are taken as the basis for judging whether the swing action is right or wrong, and the included angle a between the swing plane 6 and the ground is 45-65 degrees.

Figure 3:
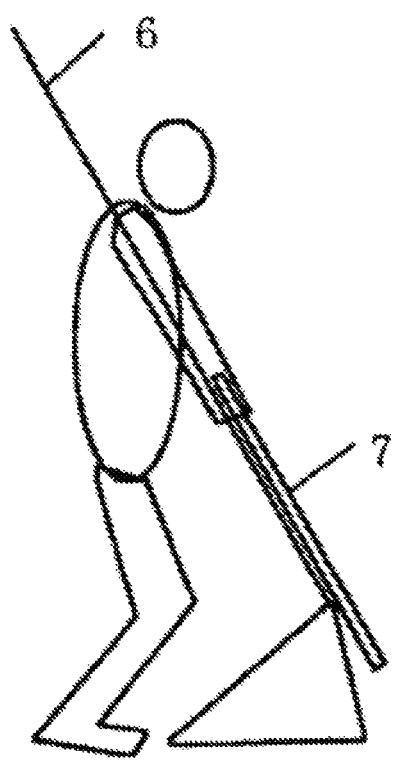
FIG. 3 is a diagram of a correct swing practice state of the present invention.
Figure 4:
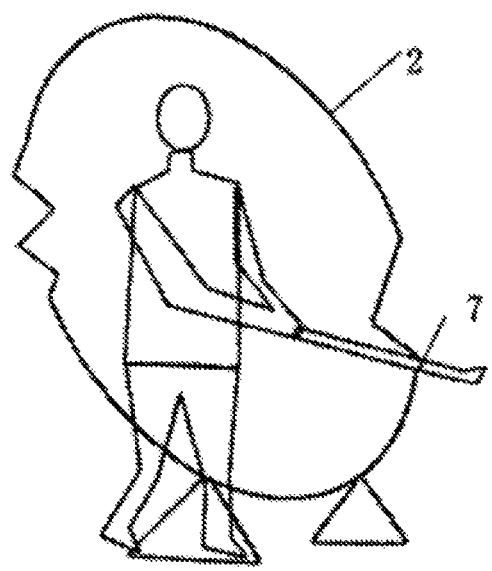
FIG. 4 is a diagram of a wrong swing practice state of the present invention.
Figure 5:
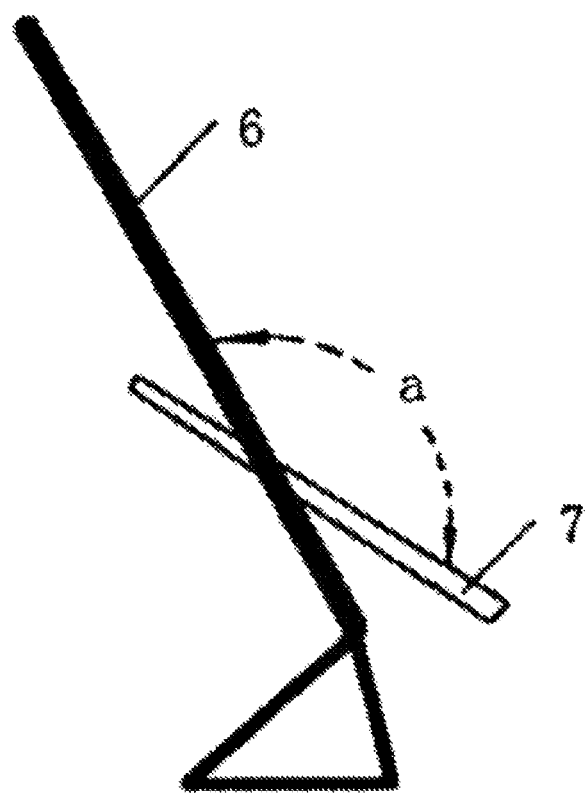
FIG. 5 is a side view of FIG. 4.

The changes of the swing plane angles of different numbers of clubs are described as follows:

The method comprises the following steps:
a. establishing the indicating member to form the swing plane, and concave-convex parts are provided for monitoring whether the included angle is formed between the club body of the club and the guiding plane at the outer side the guiding plane of the indicating member, as shown in FIG. 1;

b. adjusting the included angle a between the swing plane for guiding the swing of the club and the ground according to the numbers of the clubs, as shown in FIG. 2; and c. carrying out the swing practice; holding the club rack by the player for the swing practice on the swing plane device; if the swing keeps moving on the plane, the swing action is right, as shown in FIG. 3; holding the club rack by the player for the swing practice on the swing plane device; if the included angle is formed between the club body of the club and the swing plane, and the concave-convex parts prompt that the swing leaves the plane, the swing action is wrong, as shown in FIG. 4 and FIG. 5.

Figure 1A:
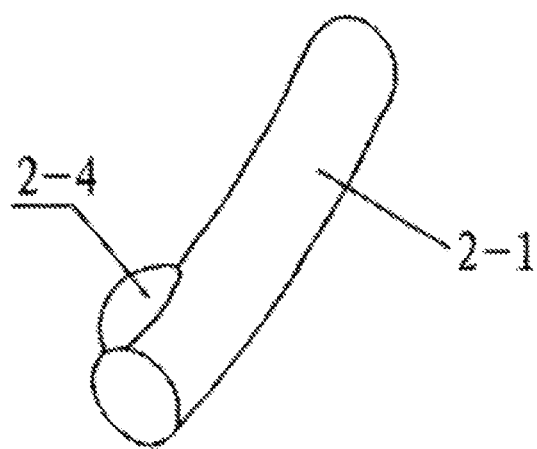
FIG. 1a is a local structural diagram of a swing guiding frame of the present invention.
Figure 7:
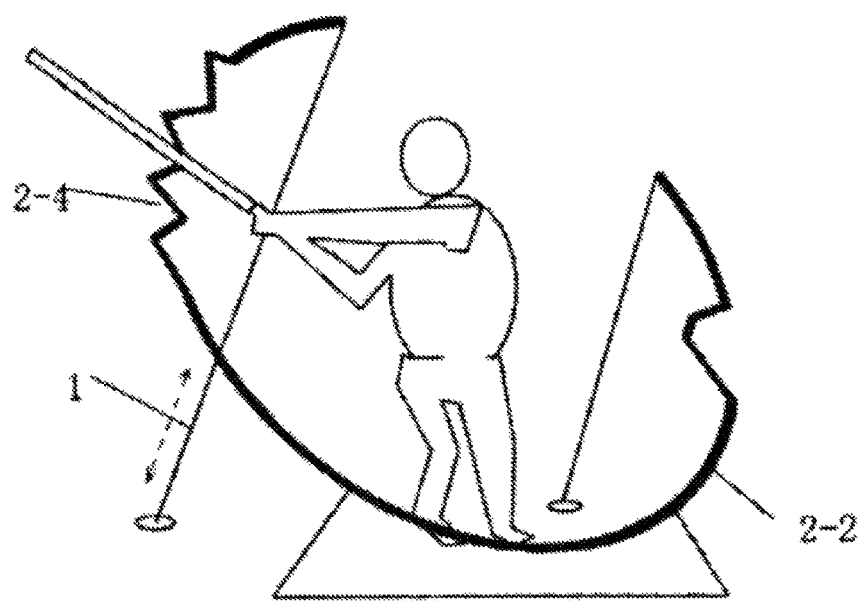
FIG. 7 is a structural diagram of another embodiment of the present invention.

In order to apply the swing indicating method to the actual swing practice, the present invention proposes the swing positioning and indicating device based on the swing indicating method, as shown in FIG. 1. The device comprises the bracket 1 and the swing guiding frame 2 arranged on the bracket 1, wherein the swing guiding frame 2 forms a certain included angle with the ground; the swing guiding frame 2 comprises a ring-shaped round rod 2-1 (as shown in FIG. 1 and FIG. 1a) or an arc round rod 2-2 (as shown in FIG. 7); the guiding plane 2-3 for supporting the club separated from the swing guiding frame is arranged on the surface of the swing guiding frame; the slant angle of 45-65 degrees is formed between the guiding plane 2-3 and the ground; and the concave-convex parts 2-4 are arranged at the inner edges of the round rods.

Embodiment 2

Figure 6:
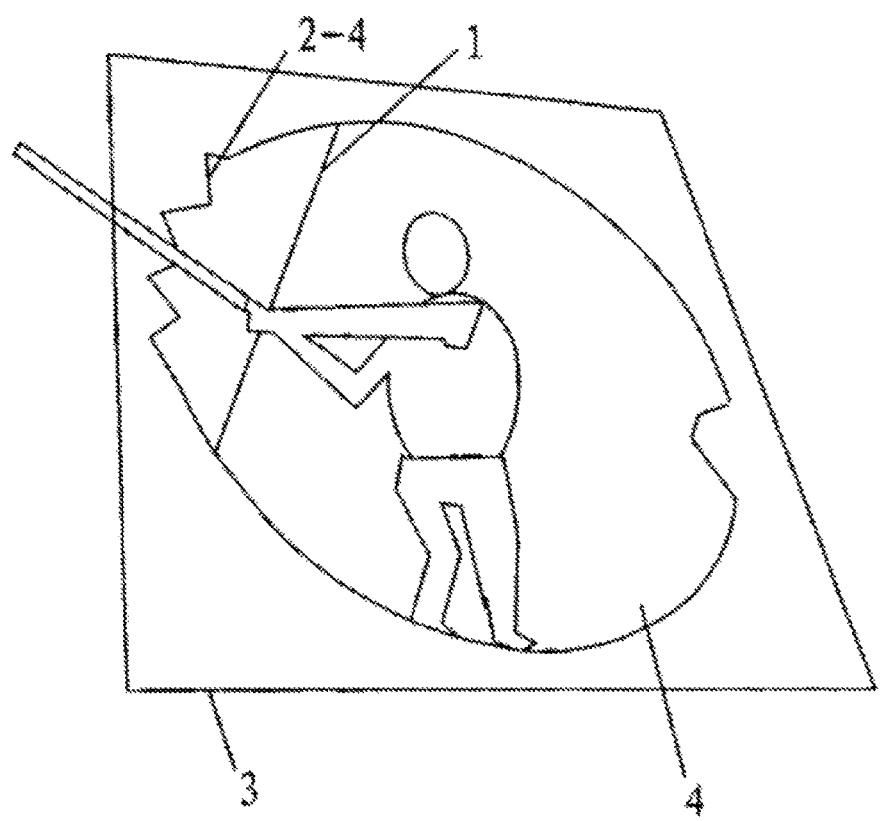
FIG. 6 is a structural diagram of another embodiment of the present invention.

As shown in FIG. 6, during the golf swing practice, in the embodiment, the plane board is adopted as the swing guiding component for guiding the club to slide; a hole for golfer to go through is formed in the middle of the plane board; the concave-convex parts pointing to the inner part of the hole are arranged at the inner edge of the hole; and the action that the club touches the concave-convex parts during swing is qualitatively taken as the wrong swing action.

The swing positioning and indicating device matched with the practice method comprises the bracket 1 and the plane board 3 arranged on the bracket 1, wherein the plane board 3 forms a certain included angle with the ground; the hole 4 for the golfer to go through is formed in the middle of the plane board; and the concave-convex parts 3-1 pointing to the inner part of the hole are arranged at the inner edge of the hole.

Embodiment 3

Figure 8:
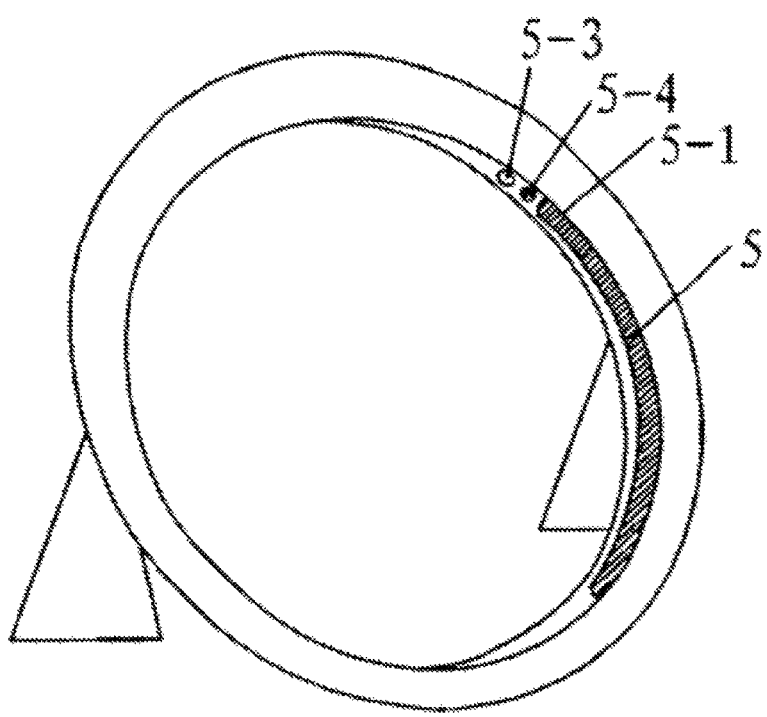
FIG. 8 is a structural diagram of installation of the inductive prompting device of the third embodiment of the present invention.
Figure 9:
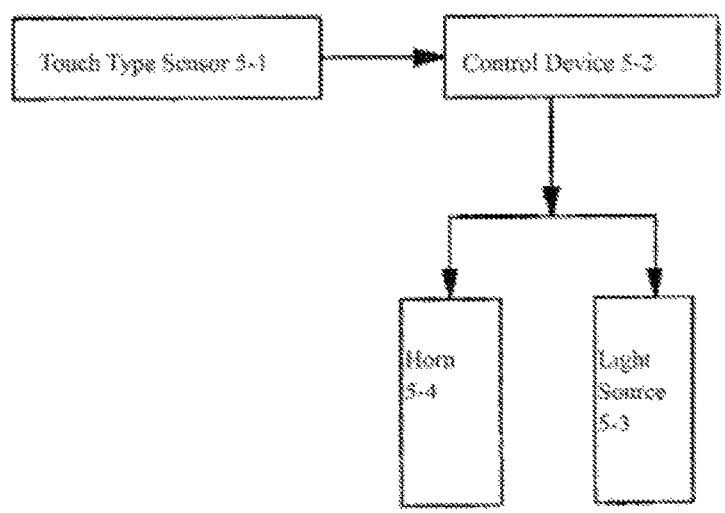
FIG. 9 is a principle block diagram of operation of the inductive prompting device.

As shown in FIGS. 8 and 9, the embodiment and the above solutions have differences that the concave-convex parts of the swing guiding frame can be replaced by the inductive prompting device 5. The inductive prompting device 5 comprises the touch type sensor 5-1, the control device 5-2, the indicating light source 5-3 and the horn 5-4. The installation position of the touch type sensor is the same as the distribution position of the concave-convex parts, not described in details herein. The touch type sensor 5-1 is connected with the control device 5-2, and the signal output end of the control device is connected with the indicating light source 5-3 and the horn 5-4. When the club touches the touch type sensor, the touch type sensor sends a signal to the control device. The control device prompts the wrong swing action to the player by virtue of the light source and a sounding mode. It should point out that the inductive prompting device can choose either the light source or the sound to prompt the wrong swing action to the player.

Embodiment 4

Figure 10:
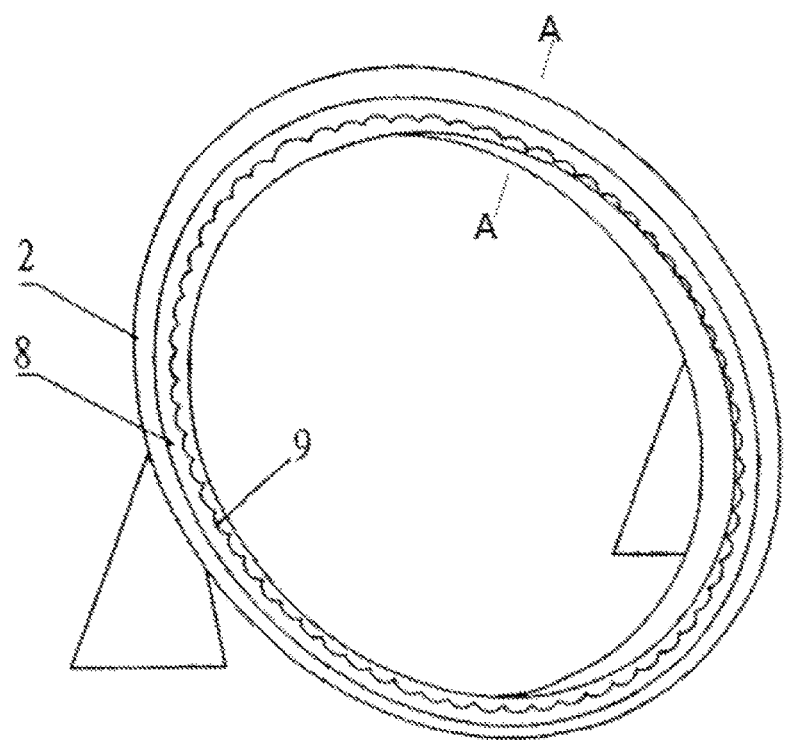
FIG. 10 is a structural diagram of another embodiment of the present invention.
Figure 11:
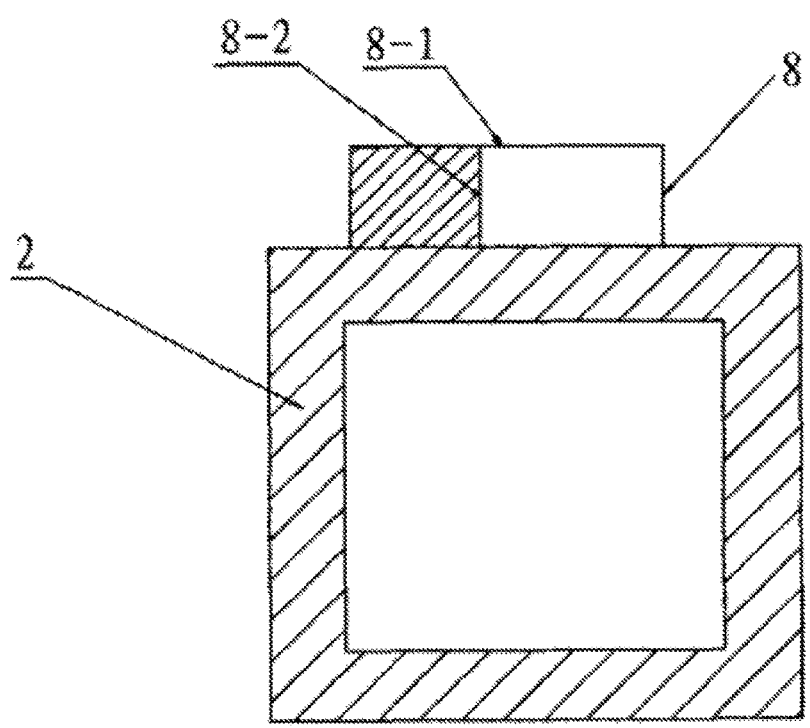
FIG. 11 is a cross section view of FIG. 10.

As shown in FIGS. 10 and 11, in the embodiment, convex ribs 8 successively distributed along the circumference of the swing guiding frame are arranged on the surface of the swing guiding frame with the rectangular cross section; the front surfaces 8-1 of the convex ribs 8 are taken as the guiding planes: the side surfaces 8-2 of the convex ribs 8 are taken as the concave-convex parts 9; and the successive concave-convex parts are in a wave shape. When the swing is right, the club body of the club slides along the guiding plane of the swing guiding frame; and when a certain included angle is formed between the club body of the club and the guiding plane, in the moving process, the club body is swung to touch the concave-convex parts, so as to prompt the wrong swing action. At the moment, the golfer can correct the wrong swing action in time.

Compared with the prior art, the present invention has the main differences that the club body slides along the swing guiding frame for swing practice, so the club is not subject to the connection limit of the swing guiding frame; the swing is mainly controlled by the golfer in the right plane; and the wrong swing action can be corrected in time through the adoption of the prompting components such as the concave-convex parts and the inductive prompting device. However, in the prior art, such as the invention in the background, the China patent application No. is CN200610168399.X; the club head is subject to the connection limit of the arc ring of the swing guiding piece; during the swing practice, only the club head can slide on the right swing plane and the golfer cannot judge whether the club body moves on the right swing plane; and according to the tangent theory, if the club body does not move on the right swing plane, the action is not the plane swing in the real sense, resulting in that the purposes of teaching and practicing cannot be achieved. The design of the present invention is suitable for everyone, provides a good teaching facility for the beginners and people requiring correction of wrong actions and is also professional practice equipment for professional players.

The above contents are the preferred embodiments of the present invention. It should he noted that for those skilled in the art, several variations and improvements can also be made without departing from the creative conception of the present invention, which belong to the protection scope of the present invention.

I claim:

1. A golf swing practice method, comprising:
    establishing a swing plane for guiding swing of a club;
    monitoring a condition whether an included angle is formed between a club body of the club and the swing plane is established outside the swing plane; and
    judging whether a swing action is right or wrong;
    adjusting a swing angle for keeping the club body of the club and the swing plane parallel with each other;
    wherein an indicating member is established to form the swing plane, a guiding plane for guiding the club to slide is arranged on the indicating member, and concave-convex parts or an inductive prompting device are/is arranged at an outer side of the guiding plane, so as to prompt a wrong swing action that an included angle is formed between the club body of the club and the guiding plane during a golfer's swing.

2. The golf swing practice method of claim 1, wherein a plane board is adopted as the indicating member for guiding the club to slide; a hole for the golfer to go through is formed in the middle of the plane board; the concave-convex parts pointing to the inner part of the hole are arranged at an inner edge of the hole; and the action that the club touches the concave-convex parts during swing is qualitatively taken as a wrong swing action.

3. The golf swing practice method of claim 1, wherein a frame-shaped member is used as an indicating member for guiding the club to slide; the concave-convex parts are arranged at the inner edge or the outer edge of the frame-shaped member; and the action that the club touches the concave-convex parts during swing is taken as a wrong swing action.

4. The golf swing practice method of claim 1, wherein an included angle between the swing plane and the ground is 45-65 degrees.

5. he golf swing practice method according to claim 1, characterized by comprising the steps:
   a. installing the concave-convex parts at an outer side of the guiding plane of the indicating member so as to monitor whether the included angle is formed between the club body of the club and the guiding plane;
   b. adjusting the included angle between the swing plane for guiding the swing of the club and the ground; and
   c. adjusting the distance between the practicer and the indicating member; swinging the club; and keeping the club body of the club sliding along the swing plane in the swing process.

6. The golf swing practice device of claim 1, wherein
a bracket and a swing guiding frame are arranged on the bracket;
the swing guiding frame forms a certain included angle with the ground;
a guiding plane for supporting the club is arranged on the surface of the swing guiding frame; and
concave-convex parts are arranged outside the guiding plane.

7. The golf swing practice device of claim 1, wherein
a bracket and a swing guiding frame are arranged on the bracket;
the swing guiding frame forms a certain included angle with the ground;
a guiding plane for supporting the club is arranged on the surface of the swing guiding frame; and
an inductive prompting device is arranged outside the guiding plane.

8. The golf swing practice device of claim 7, wherein
the inductive prompting device comprises a touch type sensor, a control device and an indicating light source or a horn;
the touch type sensor is connected with the control device, and the signal output end of the control device is connected with the indicating light source and/or the horn.

9. The golf swing practice device of claim 1, wherein
the inductive prompting device comprises a touch type sensor, a control device and an indicating light source or a horn;
the touch type sensor is connected with the control device, and the signal output end of the control device is connected with the indicating light source and/or the horn.

* * * * *